United States Patent [19]

Delpit et al.

[11] Patent Number: 4,510,601
[45] Date of Patent: Apr. 9, 1985

[54] DIGITAL FREQUENCY RECEIVER

[75] Inventors: Philippe Delpit, Paris; Philippe Duplessis, Colombes; Yves Renaudin, Bougival, all of France

[73] Assignee: Compagnie Industrielle Des Telecommunications Cit-Alcatel, Paris, France

[21] Appl. No.: 348,543

[22] PCT Filed: Jun. 25, 1981

[86] PCT No.: PCT/FR81/00084
§ 371 Date: Feb. 12, 1982
§ 102(e) Date: Feb. 12, 1982

[30] Foreign Application Priority Data

Jun. 25, 1980 [FR] France ............................. 80 14090

[51] Int. Cl.³ ............................................. H04J 3/12
[52] U.S. Cl. ............................. 370/110.3; 179/84 VF
[58] Field of Search ............................. 370/110.3, 23; 179/84 VF

[56] References Cited

U.S. PATENT DOCUMENTS

| 3,935,395 | 1/1976 | Ball et al. | 179/84 VF |
| 3,937,899 | 2/1976 | Denenberg | 179/84 VF |
| 4,025,730 | 5/1977 | Sawai | 179/84 VF |
| 4,100,378 | 7/1978 | Claasen et al. | 179/84 VF |
| 4,203,008 | 5/1980 | Cohn-Sfetcu et al. | 179/84 |
| 4,223,185 | 9/1980 | Picou | 179/84 VF |
| 4,279,017 | 7/1981 | Bos et al. | 179/84 |
| 4,354,248 | 10/1982 | Conger et al. | 179/84 |

FOREIGN PATENT DOCUMENTS 55-50764 4/1980 Japan ................................. 370/110.3

OTHER PUBLICATIONS

G. Thyssens et al., "Digital Multifrequency Receivers and Senders", Electrical Communications, vol. 54, No. 4, 1979, pp. 319–325.
F. Melindo et al., "A Digital Receiver for Multifrequency Signals from Push-Button Telephone Sets", CSELT Rapporti Technici, vol. VI No. 2, Jun. 1978, pp. 105–111.
J. Mills, "Digital MF Technique", GTE Automatic Electric Journal, May 1977, pp. 317–325.
S. Pitroda, "Digital Multifrequency Tone Receiver", Intern. Swting. Symposium Record, Jun. 1972, pp. 434–441.
A. Fukui et al., "A Study on Design of Digital MF Receiver Without Multiplier", ICC 1979, Jun. 10–14, 1979, pp. 37.5.1–6.

Primary Examiner—Douglas W. Olms
Assistant Examiner—Wellington Chin
Attorney, Agent, or Firm—Sughrue, Mion, Zinn, Macpeak and Seas

[57] ABSTRACT

A digital frequency receiver connected to a processor for the recognition of multifrequency code signals received in signalling time slots and transmitted to the receiver in digital form by at least one time multiplex link. The receiver includes means (MO) for modulating the received signals with signals whose frequency corresponds to a code being used and which are supplied by a digital generator, means (FPB) for low-pass filtering the modulated signals and means (CL) for analyzing the energy contained in the spectrum of the signals received in the neighborhood of the frequencies of the code. The invention is particularly adapted for use in time-switched telephone exchanges.

9 Claims, 6 Drawing Figures

DIGITAL FREQUENCY RECEIVER

BACKGROUND OF THE INVENTION

The invention relates to a digital frequency receiver which in particular allows the identification of voice-frequency signals in telecommunications signalling codes. It can be used in particular in time-division telephone exchanges to receive interchange signals and to receive the signalling transmitted by subscriber keypad sets.

In time-division telephone exchanges, digital receivers are often connected to circuits and lines by the connection network and by a time multiplex link such as a PCM 32-time slot European standard PCM link. The receiver analyses the signals which it receives in these 32 time slots on a time-sharing basis, operating in conjunction with a logic decision circuit.

Many types of known receivers are based on the theory of linear filters defined by finite difference equations. A receiver of this type is described in French Pat. No. 1,603,175 corresponding to U.S. Pat. No. 3,683,162. Such a receiver has the disadvantage of requiring one band-pass filter per frequency to be recognized and it is difficult to adapt it to multiple codes.

Another type of receiver described e.g. in French Pat. No. 2,269,261 consists of a unit which performs frequency translation of the received signal and which detects low-frequency signals.

This is the principle on which the present invention is based. The translation performed is equal to the frequency to be detected. A low-pass filter allows the amplitude of the DC component of the modulated signal to be determined.

For a given received signal X(t), low-pass filtering of the complex signal $$X'(t) = X(t)e^{j\omega t}$$

is performed to produce a signal whose amplitude is proportional to the energy contained in the spectrum of X(t) in the neighbourhood of the frequency which corresponds to the angular frequency $\omega$.

In practice, two circuits—a modulation circuit and a filter circuit—are used in parallel:
for multiplying by cos $\omega t$ and low-pass filtering; and
for multiplying by sin $\omega t$ and low-pass filtering. The quadratic mean of the two responses is taken.

A primary object of the invention is to produce a compact receiver controlled by a processor and capable of processing a large number of multifrequency codes.

SUMMARY OF THE INVENTION

The invention provides a digital frequency receiver connected to a processor for the recognition of multifrequency code signals received in signalling time slots and transmitted to the receiver in digital form by at least one PCM time multiplex link, the receiver including means for modulating the received signals with signals whose frequencies correspond to the code used and which are supplied by a digital generator; means for low-pass filtering the modulated signals; and means for analysing the energy contained in the spectrum of the signal received in the neighbourhood of the code frequencies.

According to one feature of the invention, the receiver includes:

a time base synchronized with the PCM connection to supply in each time slot phase signals which allow the circuits of the receiver to be enabled successively;

means for testing with a processor, including a programmable energy-analysis unit, a generator control memory and injection and sampling means; and two groups of low-pass filter cells each corresponding to one of the quadrature components, each cell being constituted by a recurrence calculation circuit which generates based on a finite difference equation and by a memory circuit used to store the intermediate values which correspond to each time slot and to each frequency.

BRIEF DESCRIPTION OF THE DRAWINGS

A preferred embodiment of the invention described hereinafter by way of example will enable a proper understanding of the features of the invention with reference to the accompanying drawings.

DESCRIPTION OF THE PREFERRED EMBODIMENTS

The receiver which is described hereinafter is applicable to a telephone exchange controlled by central computers or by distributed-control units, for example microprocessors.

A microprocessor which can supervise, for example a sender and a receiver, controls data exchange between control units and multi-frequency signalling auxiliary units. In this application the microprocessor performs the following functions relating to the receiver.

Assigning time-slots and codes in accordance with orders received from the control unit of the telephone exchange.

Confirming the signals detected and pre-confirmed by the receiver.

Pre-processing: recognition of the signals of the code, e.g. of the dialed digits.

Tests: these are carried out systematically or in accordance with orders received from the control unit.

Figure 1:
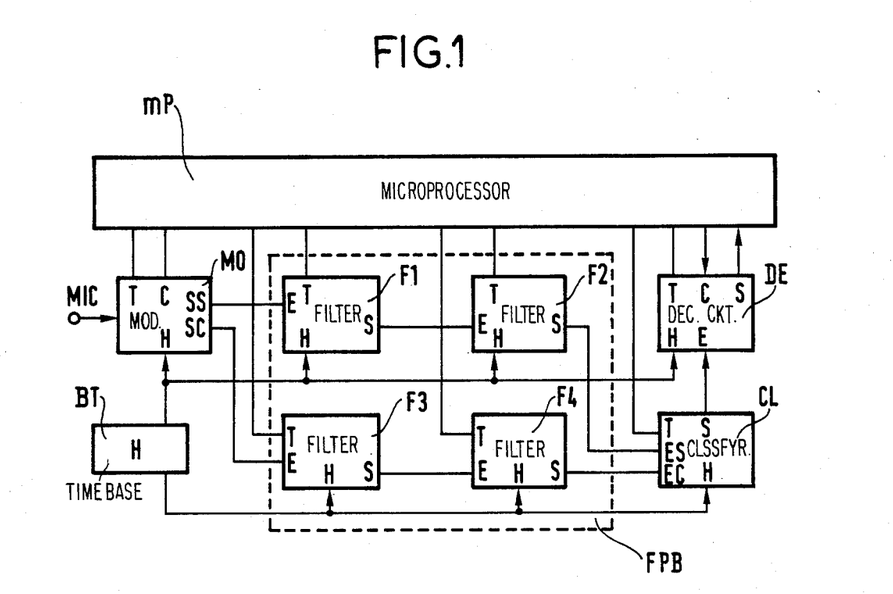
FIG. 1 is a general block diagram of a receiver of the invention and of the associated processor.

The receiver is controlled by a microprocessor mP (FIG. 1) and has the following components:

A modulator circuit MO connected to a PCM link and a programmable frequency generator. The PCM link in the embodiment described is of a European type: 32 time slots of eight bits each, the time slots being sampled at a frequency of 8 KHz and conveying signals compressed according to C.C.I.T.T. recommendation G711 in accordance with the so-called A law. The generator which is described further on may be of the type described in French Pat. application No. 80 03 572, corresponding to U.S. Pat. No. 4,370,983, which for each time slot and each frequency of the codes used, supplies the two signals cos $\omega t$ and sin $\omega t$.

A set of circuits F1 to F4 which form low-pass filters FPB.

A circuit CL which, for each frequency, takes the quadratic mean of the two components and classifies the values obtained for all the frequencies of a code, with only the three most significant values being taken into consideration.

A decision circuit DE which analyses the changes in state and pre-confirms them before communicating them to the microprocessor, whose processing load is thereby lightened.

A time base BT which uses signalling pulses on the PCM link to produce signals necessary for the circuits of the receiver to operate.

The structure of the low-pass filters used is based on the theory of difference equations.

A simple equation for a filter cell has the form $$Y[(n+1)T] = X[nT] + CY[nT],$$

where X is the input signal of a filter cell,
Y is the output signal,
T is the sampling period, and
$C = 1 - 2\pi FcT$, Fc = 3 dB cut-off frequency.
The gain of the filter cell is $\frac{1}{2}\pi Fct$.

In this application, there are obtained $2\pi FcT = 2^{-n}$ and where $T = 125\ \mu s$, the following particular cases:

$n = 5\ Fc \simeq 40$ Hz
$n = 6\ Fc \simeq 20$ Hz
$n = 7\ Fc \simeq 10$ Hz (to within less than 1%)

For integer values of n, the filter cell will therefore have to carry out only simple logic operations: shifting, addition and subtraction.

Also, shifting makes it possible to further employ unit gain cells since the value of the gain is $2^n$.

The filter described hereinafter and illustrated in FIG. 4 has four cells of this type connected in series in order to obtain a good compromise between selectivity, response time and equipment volume.

These cells carry out the following operations on the input signal X(nT) to end up with the output signal YS:

$$Y1[(n + 1)T] = X(nT) + Y1(nT)[1 - 2^{-n1}]$$

$$Y2[(n + 1)T] = 2^{-n1}Y1[(n + 1)T] + Y2(nT)[1 - 2^{-n2}]$$

$$Y3[(n + 1)T] = 2^{-n2}Y2[(n + 1)T] + Y3(nT)[1 - 2^{-n3}]$$

$$Y4[(n + 1)T] = 2^{-n3}Y3[(n + 1)T] + Y4(nT)[1 - 2^{-n4}]$$

$$Y_S = 2^{-n4}Y4\cdot[(n + 1)T]$$

In practice, a good result is obtained where n1 = n2 = n3 = 5 and n4 = 6, but the cell structure used makes it possible to determine the values of n1 to n4 as a function of the analysed code.

Figure 3:
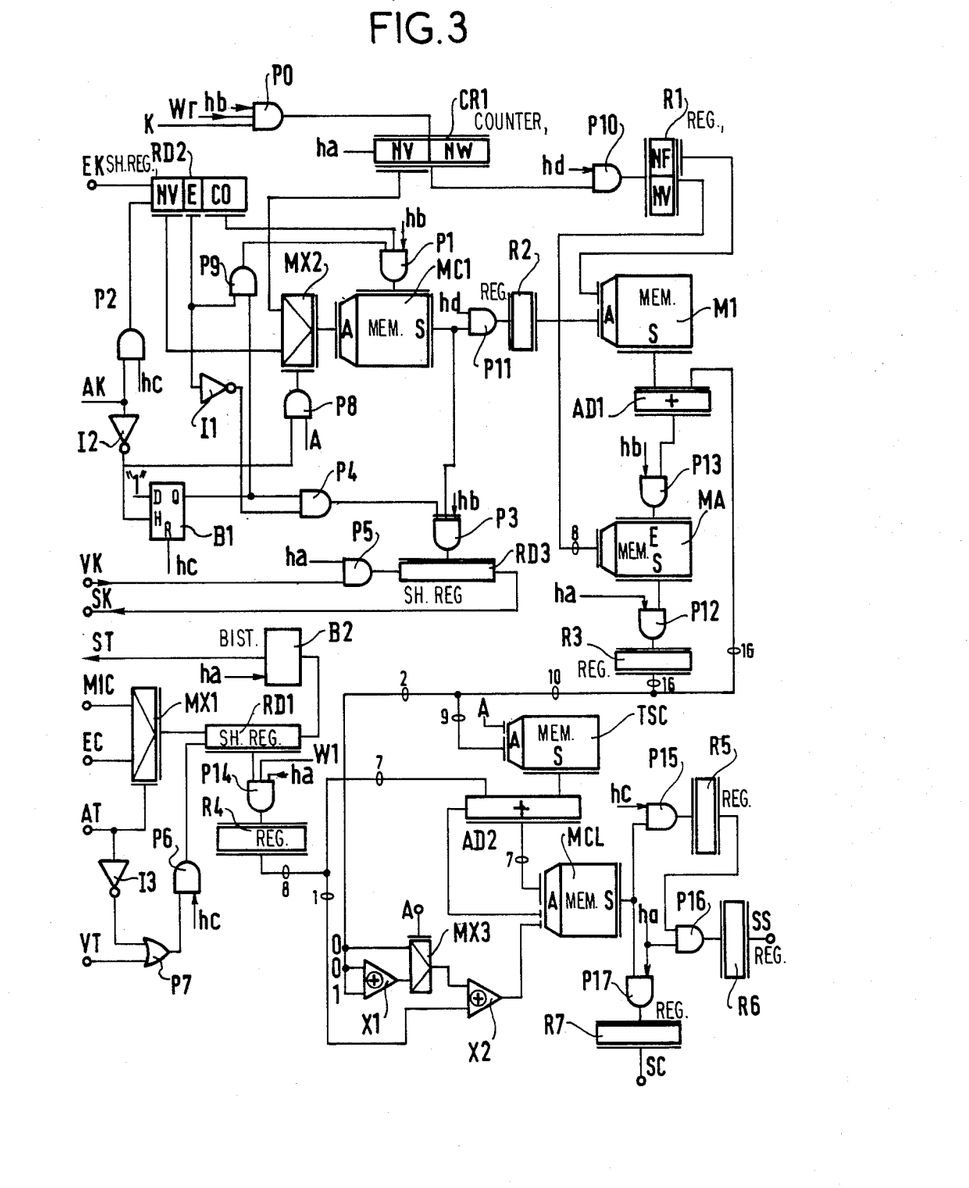
FIG. 3 illustrates a modulator circuit with a digital generator.

The receiver will now be described in detail. The modulator circuit MO which includes a frequency generator of the type described in U.S. Pat. No. 4,390,983 is illustrated in FIG. 3. This circuit also includes provision for testing by the microprocessor.

An input PCM link is connected to an 8-bit shift register RD1 by a multiplexer MX1 whose other EC input comes from the microprocessor and is used for testing.

For each time slot of the PCM link, the register RD1 stores an 8-bit multifrequency signal sample.

The general process is as follows: each code can comprise up to eight frequencies and for each time slot, use is made of the eight elementary periods which correspond to the arrival period of the bits on the PCM link to carry out the necessary operations for the eight frequencies: modulation (sine and cosine components), filtering, and spectrum analysis.

Figure 2:
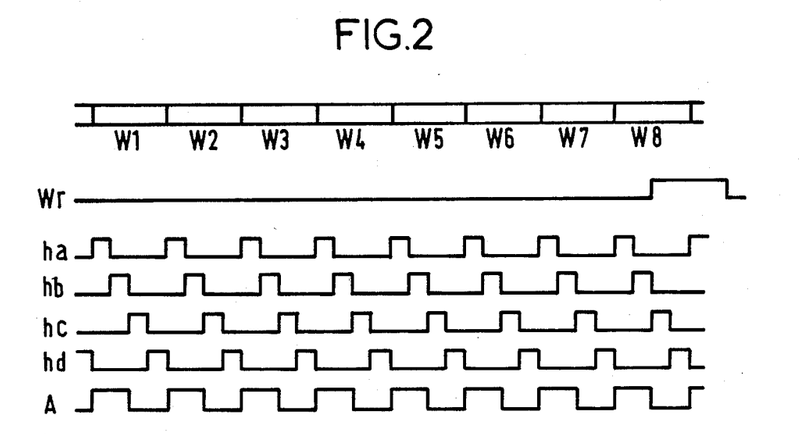
FIG. 2 is a waveform diagram of the main clock signals used.

The time base supplies signals (FIG. 2) as follows:

Elementary periods W1 to W8, which each have a duration of 488 ns, are divided into 4 periods ha, hb, hc, hd of 122 ns each.

A, which is signal A in state 1 from the rising edge of ha to the rising edge of hc, is used to process successively the sine and cosine components and to carry out other time-sharing operations.

A signal Wr which causes the receiver to be synchronized at the end of a frame. This signal appears during the third quarter hc of the elementary period W8 of time slot 31; it appears first when W8·hc = 1 and lasts 1 elementary period (488 ns)

The modulator circuit illustrated in detail in FIG. 3 is synchronized by an 8-bit counter CR1 controlled by the signal ha: five bits of the counter output indicate the number of the time slot NV and three bits indicate the elementary period (W1 to W8). The counter is initialized at each frame with a predetermined preset value K by a gate PO during the period Wr·hb.

The code number CO assigned to each time slot is stored in a memory MC1 which contains 32 words of six bits each (it is possible to have 64 codes). The memory MC1 is loaded by the microprocessor by means of a shift register RD2 and of a gate P1.

The connections between the modulator circuit and the processor are as follows:

Loading the code numbers: series terminal EK connected to the input of register RD2 and control line AK cause the register to be controlled (through gate P2) by clock signal hc.

Reading the memory: series connection SK at the output of a shift register RD3 is connected to the output of memory MC1 by a gate P3 which is controlled by the signal hb and by the output of a gate P4 which causes reading. The gate P4 is enabled firstly when a bit E from register RD2 which indicates a write order is in the zero state (inverter I1) and secondly by a flip-flop B1 controlled by signal AK via an inverter I2 and reset to zero by the signal hc. Transmission on terminal SK is controlled by signal ha (gate P5, enable signal VK).

Simulation test: series AND connection. The multiplexer MX1 is addressed by a signal AT from the microprocessor. The output of the register RD1 is connected to the series output terminal ST by a flip-flop B2 controlled by the signal ha.

Loading of register RD1 is controlled by signal hc via a gate P6 which is in turn controlled by an OR gate P7 which is enabled by signal VT or by the zero state of signal AT (inverter I3).

Analogous check and test means are used in the other circuits of the receiver and will not be described in detail.

Memory MC1 is addressed by the number of the time slot NV via a multiplexer MX2 which allows access via register RD2 or via counter CR1. The multiplexer is addressed by signal A delivered at the output of a gate P8 enabled by the output of inverter I2. Memory input gate P1 is open when hb=1 whereupon it is under the control of a gate P9, the state of which is controlled by bit E of register RD2 and by the Q output of bistable B1.

The generator includes a table TSC in the form of a PROM memory which contains 1024 values of the sine and cosine functions in logarithmic form. The least significant bit of the address receives signal A. Therefore, at each step of the counter CR1, the table successively supplies the two components.

The frequency of the transmitted signals is determined by the scan rate stored in a memory M1 which contains 1024 words (one word per frequency for each code. Here, the identification number NF of the frequency is equal to the number NW: the content of counter CR1 is stored during the period hd (gate P10) in a register R1. The data NF supplies part of the addressing of the memory M1 which is completed by the code number CO stored in a register R2 at the output of the memory MC1 (gate P11 enabled during the period hd). The address of the table is contained in a memory MA addressed by the register R1. This address is stored at each step in a register R3 (gate P12 enabled during the period ha). At each frame each word of the memory MA is incremented by means of an adder AD1 and a gate P13 which is open during each period hb. To obtain the required precision in the choice of frequencies the increment is determined with an integer part of 10 bits and a fraction part of 6 bits and only the integer part of the address is transmitted to the table TSC.

To modulate the signal received in the PCM time slots the contents of the register RD1 are stored at each change of time slot in a register R4 (gate P14 is open during the period w1·ha).

The signal is modulated by an adder AD2 connected to the output of register R4 and of Table TSC. Indeed, the A law compression on the PCM time slots is very close to a logarithmic law and (as seen in particular in the patents cited hereinabove) it is known to amplify or modulate by adding a compressed signal and a logarithmic signal.

The signal is then decompressed by means of a conversion memory MCL, for example, of the PROM type containing 512 twelve-bit words (one word per time slot and per frequency for both components). The 9 addressing bits are supplied: at the output of the adder (7 bits), by a carry output C of the adder, and at the output of a selection circuit (exclusive OR gates X1 and X2, multiplexer MX3 addressed by signal A). This arrangement makes it possible to take into account the sign of the signal, the table TSC having only the values which correspond to the interval 0 to $\pi$ of the variable. At the output of the memory MCL, the sine component is stored in an intermediate register R5 during the period hc (gate 15). During the following period hc the two sine and cosine components are stored in the output registers R6 and R7 (gate P16–P17).

The filters used for the two components are identical. The four circuits (F1 to F4) illustrated in FIG. 1 each correspond to a printed circuit board. Each printed circuit board has two identical cells CF1 and CF2 (FIG. 4), an addressing register R8 and an input register R9 connected to the input E of the circuit by a gate P18 which is open during the period hc.

Figure 4:
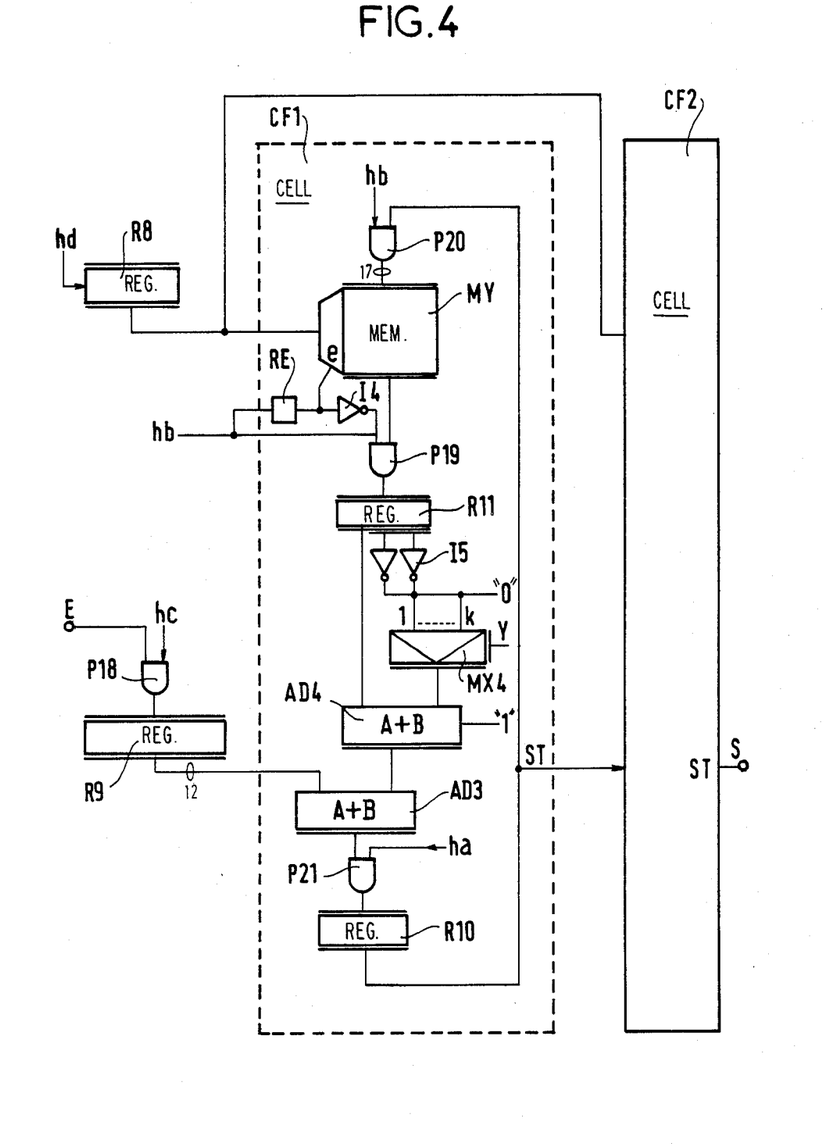
FIG. 4 illustrates schematically a digital low-pass filter used in the receiver of the invention.

Each cell, as shown in FIG. 4, has a memory MY containing 256 seventeen-bit words to store the intermediate variables Y(nt) with an output register R11 controlled during the period hb by a gate P19. The input of the memory MY is enabled during the period hb by a gate P20. Writing into the memory (input e) is slightly delayed relative to reading by a delay circuit RE which also controls gate P19 (inverter I4). Operations on the variable are carried out by means of the following additional circuits:

The operation $Y_i(nt)[1-2^{-ni}]$ is carried out by an adder AD4 which performs two's complement addition (inverter I5) on the 17 bits register R11 and of the 17 most significant bits completed on the left by ni "0"s. In this embodiment, the value of ni can be controlled by the processor: shifting takes place via a multiplexer MX4 having k inputs which selects the choice among the k values of ni in accordance with an addressing control signal Y.

The cell input signal is added by an adder AD3. The result is stored (gate P21) during the following period ha in a register R10 whose output is connected to gate P20 and to output ST of the cell.

To obtain unit-gain cells, the signal is attenuated (shift of ni−1 bits) either by handwiring if ni has a fixed value or by means of a multiplexer or of a shifter (not illustrated in FIG. 4) if the value of ni is programmable.

The memory MY is addressed on a first-in-first-out basis by register R8 without reference to the analysed signal.

Figure 5:
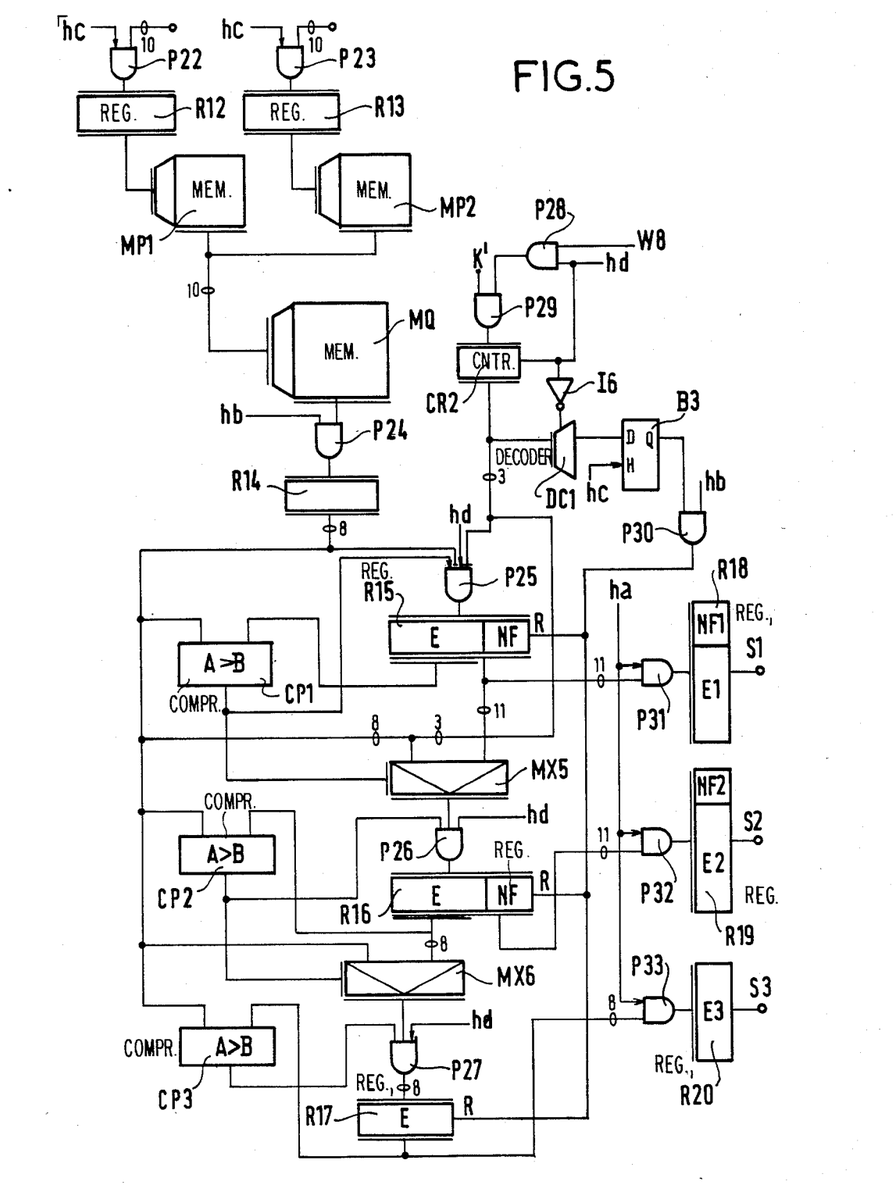
FIG. 5 illustrates a circuit which takes the quadratic mean of two signals and classifies the results obtained for the various frequencies of the same code.

Circuit CL which forms the quadratic mean of the two components of the modulated signal and classifies the responses for the eight frequencies in decreasing spectral energy order is illustrated in FIG. 5.

The quadrature components are stored during the period hc in two input registers R12 and R13 shown in FIG. 5 (gates P22, P23). The output of each register is used to address a read only memory (MP1, MP2) containing 1024 five-bit words which are used to perform the compression of the signal. At the outputs of these memories, a read only memory carries out the following operation:

$$Log\sqrt{a^2+b^2}$$

The result is stored during the period hb in a register R14. It is classified by means of three comparators CP1 to CP3 associated with corresponding three classifying registers R15, R16, R17 whose inputs are controlled by gates P25, P26, P27 which are open during the period hd when the contents of register R14 are higher than that of the controlled register and of two intermediate multiplexers MX5, MX6 controlled by the first two comparators.

The frequencies are identified by a 3-bit binary counter CR2 which increments during the period hd. At each change of time slot (period W8·hd, gate P28) the counter is reset to a value K' (gate P29) which takes into account the number of time periods Wi which have passed since the identification made in the modulation circuit. Identification is necessary only for the two dominant signals in the case of a code which does not use combinations of more than two frequencies. The contents of the counter CR2 are loaded in the portions NF of registers R15 and R16 at the signal representing the same time as the energy E.

Registers R15 to R17 are reset to zero (input R) at each change of time slot by decoding the output 7 of the counter (decoder DC1, inverter I6, bistable B3, gate P30).

Lastly, during the period ha which controls gates P31, P32, P33, the contents of the registers R15 to R17 are transferred into output registers R18 to R20.

The detection circuit DE (FIG. 6) identifies and pre-confirms the signals received depending on the three highest energy levels for each time slot and in accordance with specifications inherent to each code.

Conventionally in the case of a two frequency code, the specifications are as follows:

$$E1 - E2 \leq K1, \quad (1)$$
$$E2 \geq K2, \text{ and } (K1 \text{ to } K3 \text{ and } TE \text{ being inherent to each code.}) \quad (2)$$
$$E2 - E3 \geq K3. \quad (3)$$

Duration of the pre-confirmation period $\geq TE$

To allow great diversity of use, in accordance with the invention, E1 is compared with a constant K1 used, for example, in the case where the energy level must lie within a range determined by K4 and K2.

$$E1 \leq K4 \quad (4)$$

Figure 6:
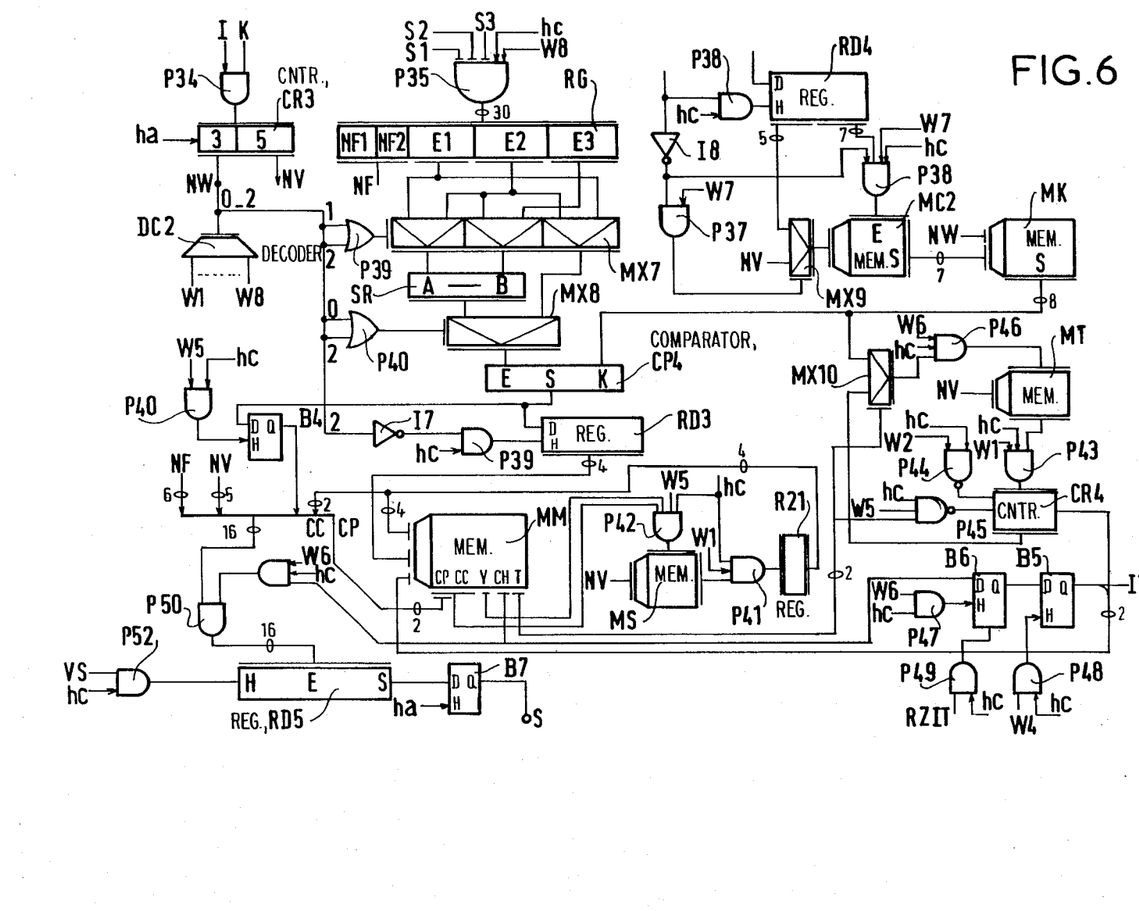
FIG. 6 illustrates a decision circuit programmed as a function of specifications of the various codes.

A counter CR3 illustrated in FIG. 6, which is set to a suitable value K during a period I determined at the end of a frame (gate 34) synchronises the circuit DE. The counter supplies data NW and NV already defined. Periods W1 to W8 obtained at the output of a decoder DC2 are here used to control the sequence of operations to be carried out for each time slot, as shown hereinafter.

During period W8·hc, an input register RG receives the output signals S1, S2, S3 from the circuit CL (gate P35).

Conditions (1), (2), (3), (4) defined hereinabove are tested at the output of the registers RG by means of a group of three multiplexers MX7, a subtractor SR a multiplexer MX8 and a comparator CP4. The results of comparisons are stored successively in a shift register RD3 and in a flip-flop B4. The constants K1 to K4 and TE of each code are stored in a memory MK addressed by the code number contained in a memory MC2 loaded by the processor and by the number NW. The memory MC2 is analogous to the memory MC1 and reading and writing thereof take place in the same manner (input shift register RD4, gates P36, P37, P38 addressing multiplexer MX9).

Testing of conditions will be described in detail hereinbelow taking into account the control of the multiplexers and the register RD3:

MX7: addressing by bits 1 and 2 of NW ("OR" gate P39);

MX8: addressing by bits 0 and 2 of NW ("OR" gate P40);

RD3: control by hc when bit 2 of NW is in the "O" state (inverter 17, gate P39);

The flip-flop B4 is controlled during W5·hc (gate P40).

| Test and pre-confirmation sequence | |
|---|---|
| NW | Operations carried out |
| 000 (W1) → | Test. (1) result in RD |
| 000 (W2) → | Test (2) result in RD |
| 010 (W3) → | Test (3) result in RD |
| 011 (W4) → | Test E1 $\geq$ K2 result in RD |
| 100 (W5) → | Test (4) result in B4 |
| W6-W7-W8 | Pre-confirmation, inputs/outputs |

Complete confirmation is an operation which leads to a decision by the control units of the telephone exchange to accept the signals detected as good or reject them as non-valid. A confirmation system is described in particular in French application Pat. No. 80 07 074.

In the present application, confirmation is prepared by circuit DE and is completed by the microprocessor mP which, for all pre-confirmed signals, receives a 16-bit state-indicator word from this circuit, in which word:

bits 0 to 4: NV (number of the time-slot concerned);

bit 5: result of test (4) (bistable B4);

bits 6 and 7: code CP indicating a state which is already confirmed;

bits 8 and 9: code CC corresponding to a signal which is being confirmed;

bits 10 and 15: NF frequency numbers NF1 and NF2 read in the input register RE.

Signals ar pre-confirmed by a logic circuit shown in FIG. 6 which includes a control read-only memory MM, a read/write memory MS to up-date codes CP and CC and a read/write memory MT to up-date time delays.

The memory MM delivers micro-instructions V, CH, and T defined hereinafter and the new values of codes CP and CC. It is addressed by data which defines the state of the time-slot being processed:

four bits indicating the present values of CP and CC read in a register R21 at the output of the memory MS (gate P41).

four output bits from the register RD3 (conditions test).

two bits at the output of a time-delay counter CR4 and of a flip-flop B5) which are defined hereinafter.

The memory MS receives the new values of CP and of CC during the period W5·hc (gate P42)

The time-delay data is stored in the memory MT and up-dated by an up-down counter CR4 connected to the output of the memory (gate P43 controlled by W1 and hc). The counter is incremented at each processing time (input e1 controlled by W2 and hc by a gate P44) and decremented by an order from the memory MM (input e2 receiving 1 micro-instruction bit T, gate P45 enabled at h2·W5.

The memory MT is addressed by the time-slot number NV. The memory is accessed by a multiplexer MX10 connected to the output of the counter CR4 and to the output of the memory MK.

The output of the multiplexer MX10 is connected to the input of memory MT by a gate P46 which is open during W6·hc. The multiplexer is addressed by a bit of the micro-instruction T.

The pre-confirmation process will now described simultaneously with a detailed description of the means for effecting exchanges with the microprocessor mP.

While a time-slot is being processed, the data NV allows constants K1 to K5 and TE to be read. In W1 the codes CP and CC are loaded into the register R21. The time delay TE loaded into the memory MT during a preceding frame (in W6) is loaded into CR4 at W1·hc, then incremented.

The tests are then carried out in W1 to W5 and the results loaded into RD3 and B4 as stated previously.

The micro-instructions for internal use, including down-count control signal T and control signal V for loading the new codes CP, CC are delivered at W5·hc.

When the time-slot comes to the end of a preconfirmation period (output C of counter CR4 in state 7), the micro-instruction CH is used to call the microprocessor by an interrupt process (output IT of bistable B5). The signal CH is taken into account at W6·hc (gate P47) by a flip-flop B6 then by the flip-flop B5 during the following period W4-hc (gate P48). The flip-flop B6 is reset to zero by a control signal RZ from the microprocessor (gate P49 opened at hc).

The data is transmitted to the microprocessor from a series terminal S connected to the output of a shift register RD5 via bistable B7 controlled by the signal ha.

The data transmitted is then as follows (total 16 bits):
Time slot number NV (5 bits);
Frequency number NF (6 bits) from the register RG;
Output of bistable B4;
Code CC at the output of R21 (2 bits);
Code CP at the output of MM (2 bits).

The register RD5 is loaded by a gate P50 controlled by the signals CH, W6, hc (gate P51). Transmission on the terminal S is controlled by the signal hc (gate P52 enabled by an enabling order VS from the microprocessor and relayed by the signal ha (bistable B7).

As described herein, the receiver in accordance with the invention uses only very common circuits and is adaptable to numerous applications and also to a great number of codes, specifications and confirmation processes, it being possible to store all these variables in read/write memories or read-only memories. Of course, the invention is not limited to the application described, and most of the various elements described can be replaced by equivalent components.

We claim:
1. A digital frequency receiver connected to a processor for the recognition of multifrequency code signals received in signalling time slots and transmitted to the receiver in digital form by at least one PCM time multiplex link, the receiver including means for modulating the received signals with signals whose frequencies correspond to the code used and which are supplied by a digital generator modulating the signal in each of plural time-slots of the time multiplex link by the sine and cosine components of each code frequency, means for low-pass filtering the modulated signals and means for analysing the energy contained in the spectrum of the signals received in the neighborhood of the code frequency;
said receiver comprising:
a time base generator synchronized with data on said PCM time multiplex link for supplying in each time slot (BT) phase signals (ba to bd, A) for successively enabling circuits of the receiver;
means for testing predetermined conditions respecting energy levels for each time slot using a processor operating in response to said time base generator, said testing means including an energy-analysis unit, a generator control memory and injection and sampling means; and
two groups of low-pass filter cells coupled to said testing controlling means each corresponding to one of the sine and cosine components, each cell comprising a recurrence calculation circuit operating based on a finite difference equation and a memory circuit for storing intermediate values which correspond to each time slot and to each frequency.

2. A receiver according to claim 1 in which each time sample is coded in n bits, wherein the phase signals supplied by the time base generator are synchronized with transitions of n bits of the time slots (W1 to Wn) so that the receiver analyses a code which includes at the most n frequencies.

3. A receiver according to claim 1 in which said finite difference equation used in the cells is of a type $Y = X + (1 - 2 F_c T)Y$, wherein each cell comprises an adder, a subtractor and a shift means for progressively calculating the variable Y in accordance with the above equation in the case where the values of Fc are limited to $2\pi F_c T - 2^{-n_i}$ where ni is an integer.

4. A receiver according to claim 3, wherein each group of cells corresponding to filtering one of the components of the modulated signal is formed by four cells in series whose frequencies are Fc1, Fc2, Fc3=40 Hz, and Fc4=20 Hz.

5. A receiver according to claim 3, wherein the shift means has a variable pitch and allows the cut-out frequency to be modified at each operation of the cell.

6. A receiver according to claim 3, wherein at the output of each cell, an ni-bit signal is shifted to the right to obtain unity gain.

7. A receiver according to claim 1, which the programmable analysis unit comprises a circuit (CL) for classifying the energy levels of the signals modulated at the frequencies of the same code formed by an operator with a read-only memory (MP1, MP2, MQ) which takes the quadratic mean of the two components and a comparison circuit (CP1 to CP3, R15 to R17, MK5, MX6, CR2) for separating the three highest energy levels (E1 to E3) and identifying the corresponding frequencies (NF1, NF2) for at least the two highest of said energy levels (E1, E2), wherein the analysis unit comprises means (MK) for storing constants (K1 to K5, TE) in a first memory corresponding to the specifications of the codes used, said means being addressed by a second memory (MC2) loaded by the processor to assign a signalling code to each time slot, and a testing unit (MX7, SR, MX8, CP4, ED3) for testing said three highest energy levels (e1 to E3) relative to said constants.

8. A receiver according to claim 7, further comprising a programmed preconfirmation unit for performing a preconfirming operation comprising an analysis repeated on several frames, data supplied by said pre-confirmation unit for testing and for supplying data (CP, CC) relating to the state of the time-slot during preceding frames and to a call of the processor by an interrupt process, executed at the end of said preconfirmation operation after a predetermined time delay.

9. A receiver according to claim 8, wherein said preconfirmation unit comprises a control memory (MM) addressed by data from said testing unit and by state indication data (CP, CC), a circuit for up-dating said state indication data (MS, R21), a circuit (MT, CR1) for up-dating said time delays and a circuit (B5, B6, B7, RD5) for data exchange with the processor.

* * * * *